(12) United States Patent
Kaminishi et al.

(10) Patent No.: US 7,210,400 B2
(45) Date of Patent: May 1, 2007

(54) FOLDING COFFEE MAKER

(75) Inventors: Hidetoshi Kaminishi, Tokyo (JP); Shigeo Suzuki, Tokyo (JP)

(73) Assignee: Jamco Corporation, Mitaka (JP)

( * ) Notice: Subject to any disclaimer, the term of this patent is extended or adjusted under 35 U.S.C. 154(b) by 332 days.

(21) Appl. No.: 10/809,854

(22) Filed: Mar. 26, 2004

(65) Prior Publication Data
US 2005/0183580 A1    Aug. 25, 2005

(30) Foreign Application Priority Data
Feb. 20, 2004    (JP)    ............................. 2004-044232

(51) Int. Cl.
*A47J 31/00*    (2006.01)
(52) U.S. Cl. .............................. 99/279; 99/306; 99/307
(58) Field of Classification Search .................. 99/279, 99/284, 306, 307; 248/240.4; 211/74
See application file for complete search history.

(56) References Cited

U.S. PATENT DOCUMENTS

| | | | | |
|---|---|---|---|---|
| 1,923,482 | A | * | 8/1933 | Frankenstein ............ 248/240.1 |
| 4,667,583 | A | * | 5/1987 | Tarozzi ......................... 99/279 |
| 4,728,281 | A | * | 3/1988 | McGuffin et al. ............ 426/433 |
| 6,047,630 | A | * | 4/2000 | Brown et al. ................. 99/279 |
| 6,227,101 | B1 | * | 5/2001 | Rabadi et al. ................ 99/280 |

FOREIGN PATENT DOCUMENTS

| | | |
|---|---|---|
| JP | 9-299017 | 11/1997 |
| JP | 2005-104430 A | 4/2005 |

* cited by examiner

*Primary Examiner*—Reginald L. Alexander
(74) *Attorney, Agent, or Firm*—Westerman, Hattori, Daniels & Adrian, LLP

(57) ABSTRACT

A coffee maker 1 capable of being used normally and conveniently during use and downsized when not in use to provide working space, comprises a coffee maker body 2 equipped with an apparatus for brewing coffee, a holder 4 capable of mounting a coffee server 5, and folding arms 3 having plural arms 21, 22 linked to form a set of arms and connected revolvably between the coffee maker body 2 and the holder 4. The coffee server 5 can be mounted on the holder 4 when the arms 3 are extended. When the coffee maker 1 is not used, the holder 4 is elevated and folded to make space for other purposes. A lock mechanism can be provided to unlockably lock the elevated holder 4 to the body 2.

6 Claims, 4 Drawing Sheets

FOLDING COFFEE MAKER

FIELD OF THE INVENTION

The present invention relates to a folding coffee maker that is suitable for installation in a galley of a vehicle.

DESCRIPTION OF THE RELATED ART

Conventionally, a galley which is a service preparation room for preparing food and beverage in a vehicle such as an aircraft is designed to store food, beverage and tableware to be served to passengers, and is generally equipped with coffee makers for serving hot beverages. FIG. 5 is a perspective view illustrating a galley of an aircraft capable of having a coffee maker installed therein. The galley denoted as a whole by reference number 50 comprises a main body 51 formed of panel members having high rigidity and light weight, such as honeycomb panels. The main body 51 is equipped with a kitchen table 52, a sink 53, and a microwave or steam oven 54. The main body 51 is further equipped with plural storage portions 55, 56 for storing beverage, food, tableware etc. that are to be served to passengers. Storage portions 57 for storing service carts are provided to the lower area of the main body 51. Service carts stowing trays having tableware mounted thereon are prepared at the departing airport in advance, and the service carts for serving meals are each connected via a connector not shown to an electrical wiring disposed within the main body 51. Plural stoppers 58 are disposed on the front face of the main body 51 for holding the stowed service carts in immovable fashion. A space 59 provided at the center of the galley can serve, for example, as a space for installing a coffee maker.

A hot-water supply unit 60 is disposed to the upper area of the main body 51 of the galley 50. The hot-water supply unit 60 comprises a hot-water tank 61 formed to the ceiling of the galley body 51, an instantaneous water heater 62, a hot-water tap 63 disposed above the sink 53, and a hot-water line 64 connecting the hot-water tank 61 and the hot-water tap 63. With respect to the hot-water tank 61 and the instantaneous water heater 62, a controller 65 is equipped to control the temperature and the amount of the hot water.

One example of a conventional coffee server on a vehicle is proposed, regarding a mobile production-and-sale vehicle of bread or the like, disposed at a rear portion of an automobile and next to a showcase (refer to Patent Document 1). Further, the present applicant has already filed a patent application regarding an aircraft galley equipped with a hot-water supply system as shown in FIG. 5 (Japanese Patent Application No. 2003-344229).

Patent Document 1: Japanese Patent Laid-Open No. 9-299017 (column [0024], FIGS. 3 and 4)

A vehicle, especially an aircraft, is equipped with a coffee maker placed in a galley, in other words, a service preparation room, for providing beverage service to the passengers. However, even though the installed coffee maker is for professional use, it is in principle not different from a coffee maker for household use, containing a space for housing a coffee server and a heating unit for heating cold water to hot water, and takes up a considerable space. According to the conventional coffee maker, even when the coffee maker is not in use, the space in the galley occupied by the coffee server could not be downsized. Reduction of installation space is always considered an important challenge for equipments to be installed in a galley, and there are demands for further reduction of installation space and downsizing of coffee makers equipped in the galley.

SUMMARY OF THE INVENTION

The present inventors have noticed that the space for housing the coffee server in the coffee maker is required only during use of the coffee maker, and attempts to solve the problem of the prior art by folding in the space for housing the coffee server when the coffee maker is not in use.

The object of the present invention is to provide a coffee maker for a vehicle that can be used conveniently as a normal coffee maker during use, and can be downsized when not in use to minimize the space taken up by the coffee maker.

In order to solve the problems mentioned above, the coffee maker according to the present invention comprises a coffee maker body equipped with an apparatus for brewing coffee; plural sets of folding arms, each set having plural arms linked revolvably, wherein at least two sets of folding arms are disposed on each side of the coffee maker body with their upper ends revolvably fixed to the coffee maker body; a holder fixed revolvably to lower ends of the folding arms and capable of holding a coffee server when the folding arms are in an extended state; and a lock mechanism for unlockably locking the holder to the coffee maker body when the holder is at an ascended position in proximity to the coffee maker body.

According to the present coffee maker, in order to mount a coffee server, the lock mechanism is unlocked and the sets of folding arms in folded states are extended. Since at least two sets of folding arms are disposed on each side of the coffee maker body, respectively, the holder fixed to the lower end of the folding arms descend in parallel to the coffee maker body when the arms are being extended. Thus, a space is secured between the maker body and the holder, and a coffee server can be mounted on the holder that is held horizontally and stably. When the coffee maker is not in use, the folding arms can be folded so as to approximate the holder to the coffee maker body, by which the space taken up by the coffee maker can be minimized in a very short time.

According to the present coffee maker, the lock mechanism is equipped with a lever fixed to the coffee maker body and in contact with at least a bottom surface of the holder taking its elevated position, wherein the lock can be unlocked by releasing the lever from the holder. By utilizing as the lock mechanism a lever that comes into contact with at least the bottom surface of the holder taking the elevated position, the weight of the holder can be supported by the lever, and the holder can be locked in position so as not to move unexpectedly away from the coffee maker body. The lever is only required to have a locking and unlocking mechanism for the holder, and the movement of the lever or the biasing force thereof can be determined appropriately.

The present folding coffee maker can be applied to the galley installed in a vehicle such as an aircraft, a railway vehicle, a ship or a camping car. In a vehicle such as an aircraft, a railway vehicle, a ship or a camping car, not much space is allowed to be occupied by the galley. The application of the present folding coffee maker to the galley contributes to downsizing the space of the galley while enabling to provide the same coffee and beverage services as before to the passengers.

It is preferable for the folding coffee maker applied to a galley to receive supply of hot water for brewing coffee from a hot-water supply unit equipped to the galley. If the coffee maker itself must be equipped with a heating device for heating cold water to make hot water, the coffee maker body becomes bulky, taking up too much space. Therefore, by receiving supply of hot water for brewing coffee from a hot-water supply unit equipped to the galley, the space taken up by the coffee maker can be reduced, and thus, the coffee maker can contribute to cutting down the space required for the galley.

According to the folding coffee maker applied to a galley, it is preferable to dispose the coffee maker body slidably between a drawn position at a front side of the galley and a stowage position at a back side of the galley. By slidably disposing the coffee maker body between the drawn position at the front side of the galley and a stowage position at the back side thereof, when using the coffee maker, the coffee maker body is pulled out to the drawn position at the front side of the galley, and then the holder is lowered for use. When the coffee maker is not in use, the holder is elevated and locked onto the coffee maker body, and with the locked status maintained, the coffee maker body is pushed back into the stowage position at the back side of the galley, thereby safely stowing the coffee maker in the galley. Even when the coffee maker is being used, a space exists at the back side of the compartment installing the coffee maker, which can be utilized for other purposes. When the coffee maker is not in use, almost all the space in the compartment can be used for other purposes.

According to the coffee maker of the present invention arranged as described above, the coffee maker can be utilized conveniently during use as a normal coffee maker, but when it is not in use, the coffee maker can be folded up and stowed in a compact fashion. As a result, the installation space for the coffee maker can be downsized, and the cleared space can be utilized for other purposes.

DETAILED DESCRIPTION OF THE PREFERRED EMBODIMENT

Figure 1:
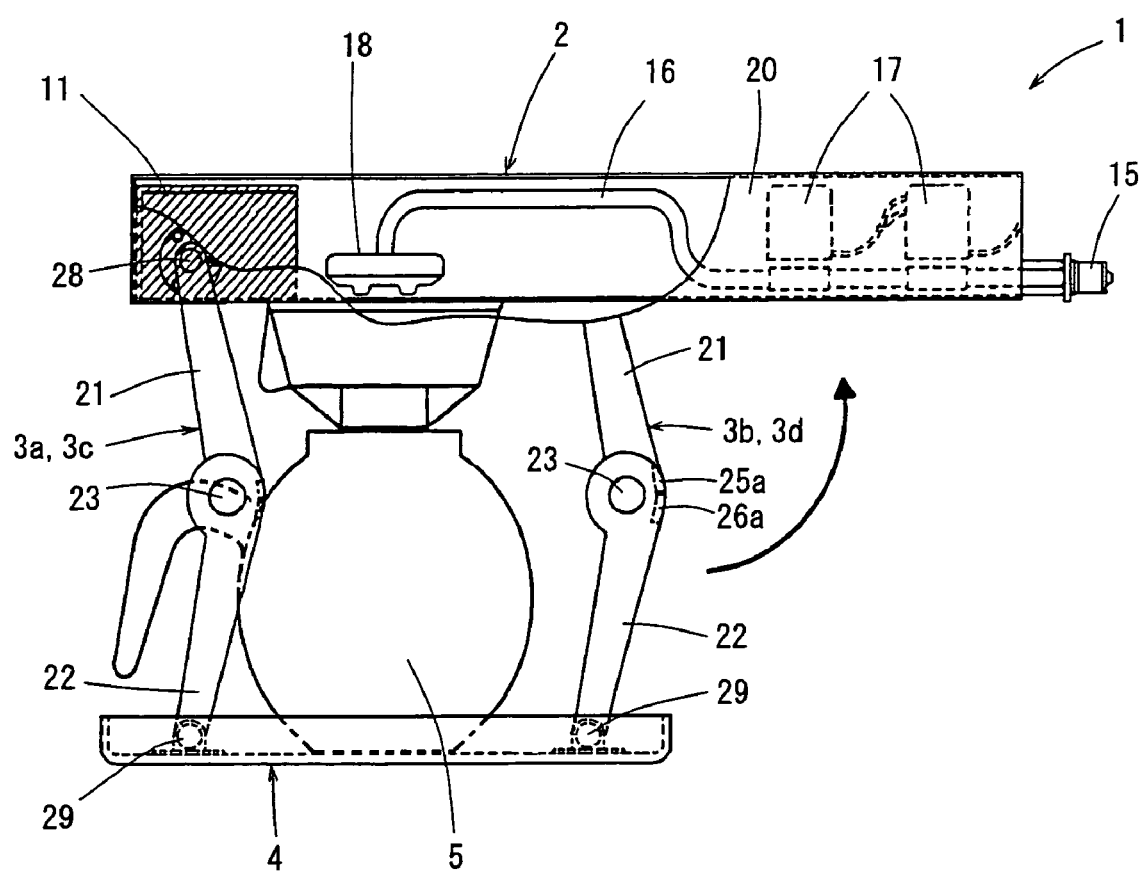
FIG. 1 is a side view showing in partial cross-section a used state of one embodiment of a coffee maker according to the present invention.

Now, with reference to the accompanied drawings, the preferred embodiments of the coffee maker according to the present invention will be described. FIG. 1 is a side view showing in partial cross-section the status of use of the coffee maker according to one embodiment of the present invention, FIG. 2 is a front view of the coffee maker illustrated in FIG. 1, and FIG. 3 is a side view of the coffee maker shown in FIG. 1 with the folding arms in the folded state.

Figure 2:
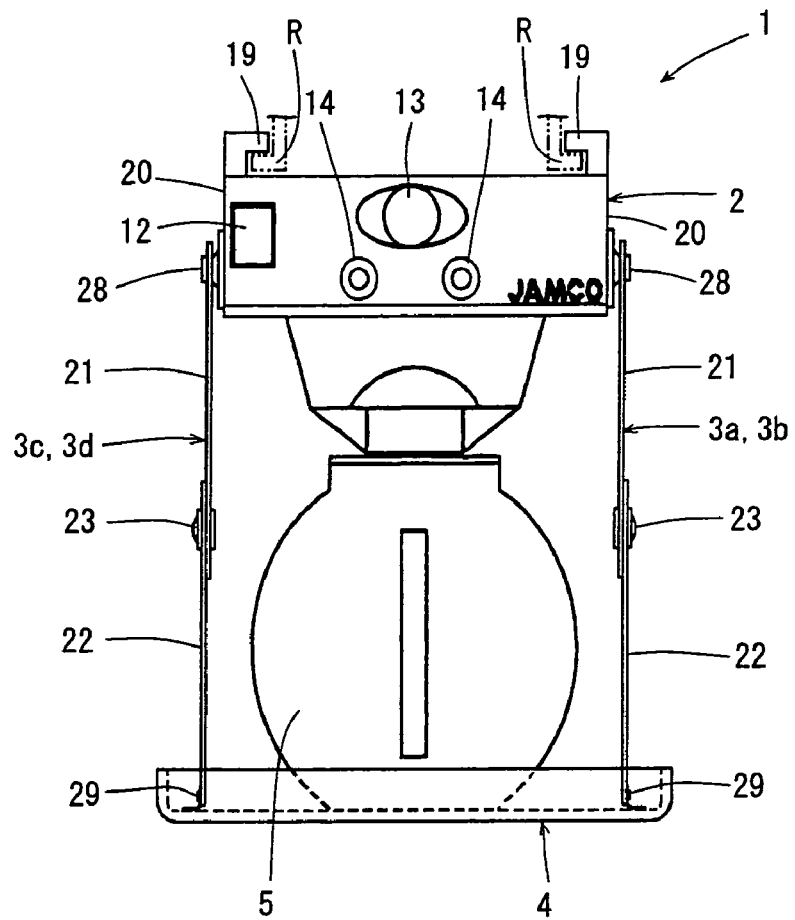
FIG. 2 is a front view of the coffee maker illustrated in FIG. 1.
Figure 3:
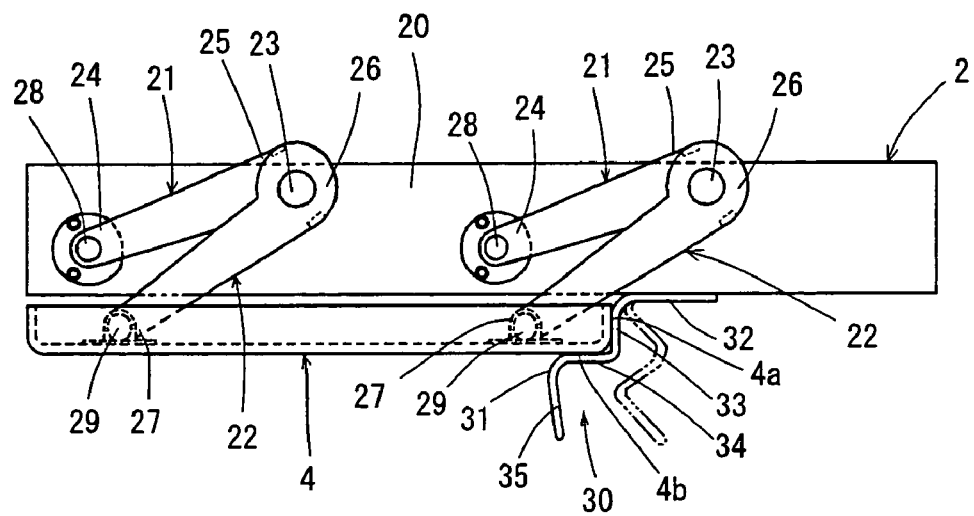
FIG. 3 is a side view of the coffee maker illustrated in FIG. 1, wherein the folding arms are in a folded state.

The coffee maker 1 illustrated in FIGS. 1 and 2 comprises a coffee maker body 2 fixed to a galley and capable of being drawn out, plural sets of folding arms 3a, 3b, 3c, 3d (collectively denoted by reference number 3) having their upper ends revolvably fixed to the coffee maker body 2, a holder 4 revolvably fixed to the lower ends of the folding arms 3, and a coffee server 5 capable of being mounted on the holder 4 when the folding arms 3 are extended.

The coffee maker body 2 is a box-shaped body with a low height and a long depth, having an operating portion and a control board portion 11 at the front (draw out) side thereof (front side of FIG. 2 and left side of FIG. 1), and a water supply port 15 disposed at the back side thereof. The operating portion has a main switch 12 and knobs 13, 14 for adjusting the amount of hot water being supplied or for selecting the operating modes when necessary. A hot-water supply pipe 16 is disposed in the coffee maker body 2 extending from a water supply port 15 to a position corresponding to the coffee server 5, and a solenoid valve 17 is disposed in midstream of the hot-water supply pipe 16 for permitting and intercepting the supply of hot water in response to the control from the control board portion 11. The hot-water supply pipe 16 extends to the position directly above the coffee server 5 mounted on the holder 4, and at the tip of the hot-water supply pipe 16 is placed a shower head 18 facing downward for brewing coffee.

The coffee maker body 2 has, on both sides of the upper surface thereof, a pair of rail mounts 19, 19 for mounting the body to the galley which extends in the direction for drawing out the coffee maker body 2. Each rail mount 19 has an engagement structure with an L-shaped cross-section as shown in FIG. 2, and the rail mounts are disposed in confronting relations with one another. By having the rails disposed in the galley engage with the rail mounts 19, 19, the coffee maker 1 can be drawn out or stowed via sliding movement with respect to the galley.

There are two sets of folding arms 3 disposed on each of the left and right sides of the coffee maker body 2 with respect to the draw-out direction, so in other words, a total of four sets of folding arms 3 are disposed. Each set of folding arms 3 is composed of an upper arm 21 and a lower arm 22. A mounting end 24 of the upper arm 21 to the coffee maker body 2 is revolvably connected via a shaft 28 to a side surface 20 of the body 2, and a mounting end 27 of the lower arm 22 to the holder 4 is revolvably connected via a shaft 29 to the holder 4. The mutual connecting ends 25, 26 of the upper and lower arms 21, 22 are revolvably linked via an intermediate shaft 23. Stoppers 25a, 26a for restricting the degree of revolution of the intermediate shaft 23 are provided to the connecting ends 25, 26. Therefore, even when the folding arms 3 are fully extended, the extended upper arm 21 and lower arm 22 do not form a straight vertical line, but rather, form a somewhat elbowed shape, making it easier to determine the direction of fold when folding the arms.

The holder 4 is a shallow tray-shaped member, and as shown in FIG. 1, has a depth shorter than the coffee maker body 2, and is located in the front side of the body. The width of the holder 2 is wider than the coffee maker body 2, as shown in FIG. 2. Therefore, the mounting end 27 of the lower arm 22 is fixed to the inner side of the holder 4, so as to prevent pinching of hands and fingers when moving the holder 4 up and down. As shown in FIGS. 1 and 2 which illustrate the folding arms 3 in their fully extended state, a sufficient space for mounting a coffee server 5 to the holder 4 is formed between the coffee maker body 2 and the holder 4, allowing the coffee server 5 to be placed in or taken out of the holder 4 through the folding arms 3, 3 disposed on the front side.

FIG. 3 shows the folding arms 3 in their folded state. By pushing up the holder 4, the holder 4 can be placed directly below and in proximity to the coffee maker body 2. In this folded state, the intermediate shaft 23 is brought up and folded at a position above the mounting shaft 28 connecting the arm 21 to the coffee maker body 2. In order to lock the holder 4 at this elevated position, the coffee maker body 2 is equipped with a lock mechanism 30. The lock mechanism 30 in this example consists of a spring plate 31 having a bent shape, and according to the illustrated locked state, the lock mechanism comprises a fixing portion 32 secured to the bottom surface of the coffee maker body 2, a first contact portion 33 bent and extended downward from the fixing portion 32 and capable of coming into contact with a side surface 4a at a depth (back) side of the holder 4, a second contact portion 34 bent and extended sideways from the first contact portion 33 and capable of coming into contact with a portion of a bottom surface 4b adjacent to the side surface 4a at the back side of the holder 4, and a manipulation portion 35 bent and extended downward from the second contact portion 34. By manipulating the manipulation portion 35 with fingers, the locking and unlocking of the lock mechanism 30 is enabled. In other words, by pushing the manipulation unit 35 toward the back from the state shown in FIG. 3, the spring plate 31 is deflected to the state illustrated by the imaginary line, by which the lock of the holder 4 is unlocked and the holder 4 is allowed to descend.

Figure 5:
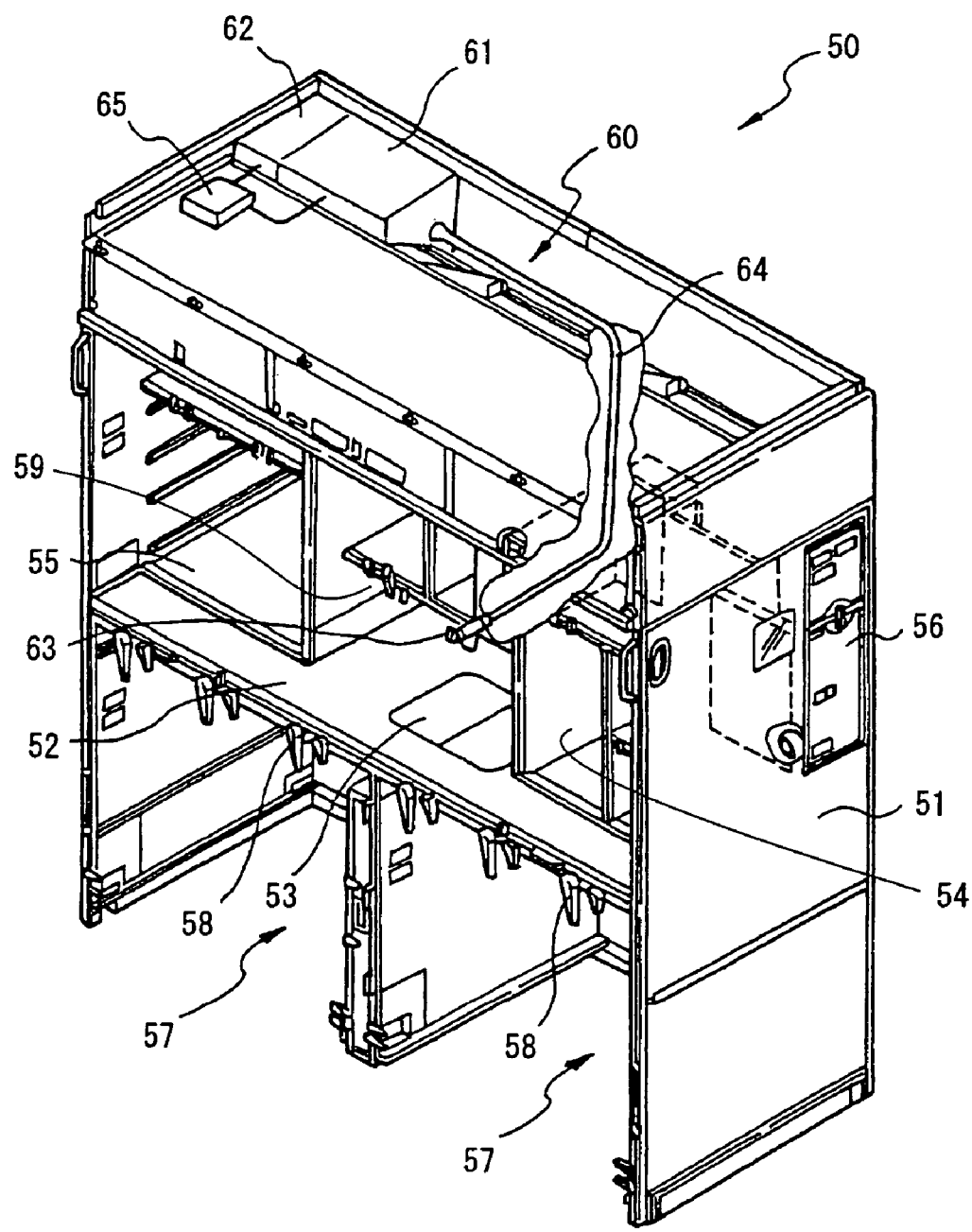
FIG. 5 is a perspective view showing a galley of an aircraft.

The above-mentioned folding coffee maker utilizes a hot-water supply system disposed to the galley 50 like the one described with reference to FIG. 5. That is, the hot-water supply line 64 of the hot-water supply unit 60 illustrated in FIG. 5 is connected to a water supply port 15, by which the present coffee maker can receive supply of hot water from the galley 50. By having hot water supplied from the hot-water supply unit 60 equipped to the galley 50, the present coffee maker no longer requires the water heating device required in a conventional coffee maker, according to which the structure of the coffee maker is simplified and downsized. Thus, the amount of power consumed by the galley as a whole can be cut down. Further, since there is no need for a water heating device, the construction of the coffee maker can be made more compact.

Figure 4:
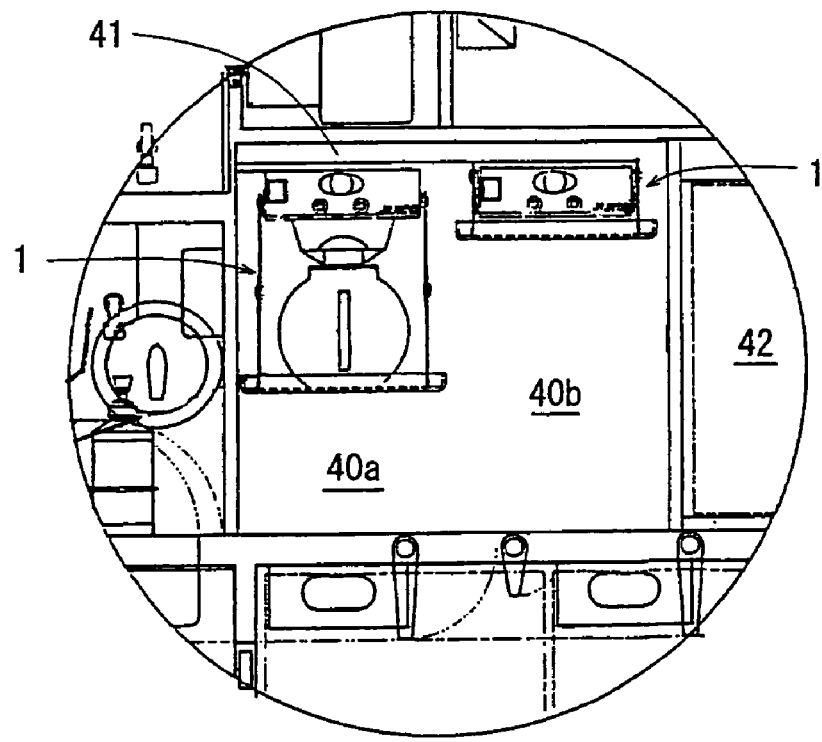
FIG. 4 is an explanatory view showing how the folding coffee maker according to the present invention is used in a galley.
Figure 4:
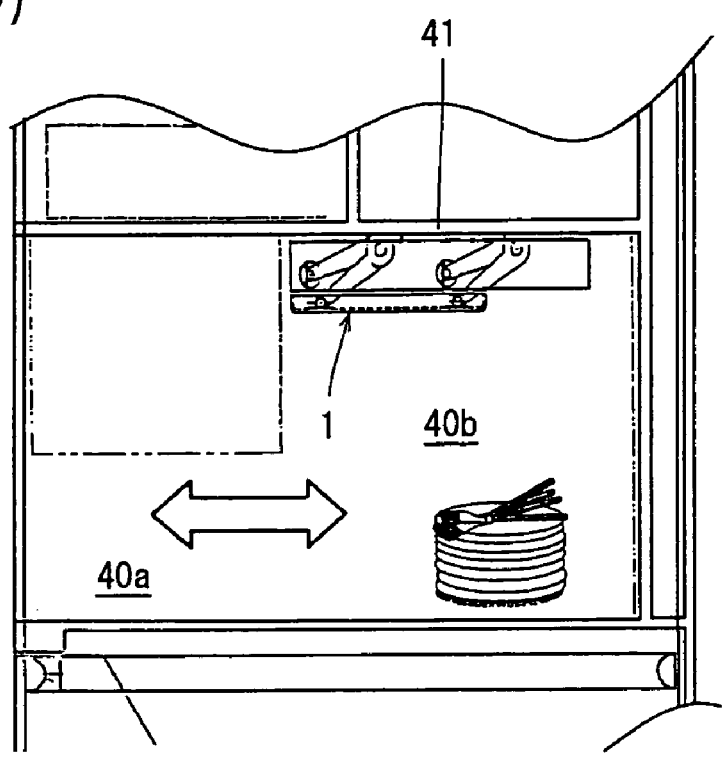

FIG. 4 is an explanatory view showing the status of use of the folding coffee maker in a galley according to the present invention. FIG. 4(a) is a drawing illustrating a portion of the galley from the front, and FIG. 4(b) is a view showing in cross-section a portion of the galley shown in FIG. 4(a). As shown in FIG. 4(a), two folding coffee makers 1, 1 are disposed side by side on the lower surface of a shelf 41 in the galley, hung on rails R (not shown, refer to FIG. 2) and capable of being drawn out toward the front. The folding coffee maker 1 on the left side shows a used state in which the coffee server is placed in the coffee maker, and the folding coffee maker 1 on the right side shows an unused state in which the arms are folded in and the holder stowed. Since the folding coffee maker 1 has a compact structure without a heating device, when it is in a used state as shown on the left, the compartment has a vacant space 40a below and behind the coffee maker 1. When it is in an unused state as shown on the right, there is a large vacant space 40b below the very small space occupied by the coffee maker 1 stowed at the upper back side of the compartment. Such vacant space 40a, 40b can be used effectively, for example, for temporarily placing food, dishes or the like.

The above-described embodiment illustrates only one possible example of the folding arms 3, and apparently, various changes and modifications can be made to the number of arms, the design thereof and so on so long as the folding arms maintain their folding function. Similarly, the holder 4, the rail mounts 19, the lock mechanism 30 shown in FIG. 3 or the like of the embodiment are merely examples, and apparently, various changes and modifications can be made so long as they maintain their respective functions to support a coffee server, to enable sliding movement of the coffee maker and to provide a locking mechanism capable of locking and unlocking the holder.

According to the above-described embodiment, the present invention is applied to an aircraft as one example of a vehicle, but the present invention is not limited to such example. It is apparent that the present invention can be applied to other vehicles such as camping cars, railway vehicles having dining cars or service counters and leisure boats, or to kitchen facilities for lodging cabins and the like where there is high demand for downsizing installation space.

What is claimed is:

1. A folding coffee maker comprising:
a coffee maker body for brewing coffee;
plural sets of folding arms, each set having plural arms linked revolvably, wherein at least two sets of folding arms are disposed on each side of the coffee maker body with their upper ends revolvably fixed to the coffee maker body;
a holder fixed revolvably to lower ends of the folding arms and capable of holding a coffee server when the folding arms are in an extended state, wherein the holder takes a lower position when the folder arms are in the extended state, and wherein the holder takes an upper position when the folder arms are folded; and
a lock mechanism for unlockably locking the holder to the coffee maker body when the holder is at the elevated position in proximity to the coffee maker body.

2. The folding coffee maker according to claim 1, wherein the lock mechanism is equipped with a lever fixed to the coffee maker body and in contact with at least a bottom surface of the holder taking the elevated position, and the lock can be unlocked by releasing the lever from the holder.

3. The folding coffee maker according to claim 1, wherein the folding coffee maker is applied to a galley installed in a vehicle such as an aircraft, a railway vehicle, a ship or a camping car.

4. The folding coffee maker according to claim 3, wherein the folding coffee maker receives supply of hot water for brewing coffee from a hot-water supply unit equipped to the galley.

5. The folding coffee maker according to claim 3, wherein the coffee maker body is disposed such that the coffee maker body is drawn out from a stowage position inside the galley.

6. The folding coffee maker according to claim 1, wherein the holder holds the coffee server when coffee is brewed.

* * * * *